(12) United States Patent
Tsai

(10) Patent No.: US 7,936,358 B2
(45) Date of Patent: May 3, 2011

(54) INTEGRATED COLOR MANAGEMENT

(75) Inventor: Leonard Tsai, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 850 days.

(21) Appl. No.: 11/796,238

(22) Filed: Apr. 27, 2007

(65) Prior Publication Data

US 2008/0266317 A1 Oct. 30, 2008

(51) Int. Cl.
G09G 5/02 (2006.01)
(52) U.S. Cl. .......................... 345/602; 345/549
(58) Field of Classification Search ................... 345/602
See application file for complete search history.

(56) References Cited

U.S. PATENT DOCUMENTS

| | | |
|---|---|---|
| 6,670,964 B1 | 12/2003 | Ward |
| 6,826,303 B2 | 11/2004 | D'Souza |
| 6,894,706 B1 | 5/2005 | Ward |
| 7,028,309 B2 | 4/2006 | Ward |
| 7,046,255 B2 | 5/2006 | D'Souza |
| 7,047,462 B2 | 5/2006 | Brown |
| 7,106,344 B2 | 9/2006 | D'Souza |
| 2002/0063666 A1* | 5/2002 | Kang et al. ..................... 345/87 |
| 2003/0210375 A1 | 11/2003 | Sikharulidze |
| 2005/0259114 A1 | 11/2005 | Belmon |
| 2006/0187181 A1 | 8/2006 | Kim |
| 2006/0193148 A1 | 8/2006 | Bang |
| 2006/0250412 A1* | 11/2006 | Chen et al. ..................... 345/589 |

* cited by examiner

Primary Examiner — Xiao M Wu
Assistant Examiner — Maurice McDowell, Jr.

(57) ABSTRACT

In one embodiment, a display device comprises a timing controller, a first computer readable memory medium coupled to the timing controller and comprising a first color table, a video processor coupled to the timing controller via a communication link and comprising logic to request the first color table from the timing controller, and use data in the first color table to implement a color correction routine.

16 Claims, 3 Drawing Sheets

INTEGRATED COLOR MANAGEMENT

BACKGROUND

Color digital video displays such as, e.g., flat-panel televisions, liquid crystal display (LCD) monitors for computer systems, and the like represent full color images by mixing of three basic colors: red, green and blue (RGB). The human visual system predictably perceives the close juxtaposition of these three basic colors as one resultant color. This illusion is the basis for color image processing.

Computer-based graphics/video systems include a graphics controller (and/or a video processor) that mixes red, green, and blue colors by assigning an intensity value to each constituent color. In this document, the term video processor is used to refer generally to either a video processor or to a graphics controller. Generally, the working range of intensity values is from zero to an upper threshold. The intensity values are converted to voltages, which are applied to a light source and/or color filter. Thus, a zero intensity value assigned to a specific color results in the corresponding color being completely dark. By contrast, an intensity value set at the upper threshold results in the corresponding color being presented at maximum intensity (i.e., at 100%). Intensity values assigned to the constituent colors produce corresponding, but not necessarily proportional changes in actual displayed brightness for the corresponding color and, thus, corresponding changes in resulting perceived color.

The term "gamma function" is used to define the relationship between the input voltage and the output brightness of a display. The brightness of a display should be equal to a constant multiplied by the input voltage raised to the power of gamma. Gamma is a rational number between zero and infinity which is provided by a monitor's manufacturer and is based on measurements made by the manufacturer.

Displays such as, e.g., cathode ray tube (CRT) displays or liquid crystal (LCD) displays exhibit variations in the color response. In most cases, the variances in basic color points from one monitor to the next are only slight. However, even small variances can result in a viewer perceiving different colors.

Presently, sRGB (standard Red Green Blue) monitors have the ability to precisely control intensities and, thus, the ability to display accurate colors. Many sRGB monitors are designed to utilize a standard non-linear color space that is reliably consistent across the various models of sRGB monitors. However, sRGB monitors are notoriously difficult to manufacture.

Manufacturers of electronic devices such as, e.g., displays, LCD televisions, and computer systems have implemented color correction techniques to correct color deviations in displays. Some color correction techniques utilize a color correction table which stores adjustment factors to be applied to intensity values. Examples of color correction techniques are presented in commonly assigned U.S. Pat. Nos. 6,862, 029; 6,992,682; 7,046,255; and 7,106,344 to D'Souza et al., the disclosures of which are incorporated herein by reference in their entirety.

In some video displays the graphics processor (and/or video controller) may be designed by a first entity using a proprietary color table and the timing controller may be designed by a second entity also using a proprietary color table. The use of two different color tables increases the cost of the display, increases the computational complexity required for graphics processing, and may also result in suboptimal color presentation.

DETAILED DESCRIPTION

Figure 1:
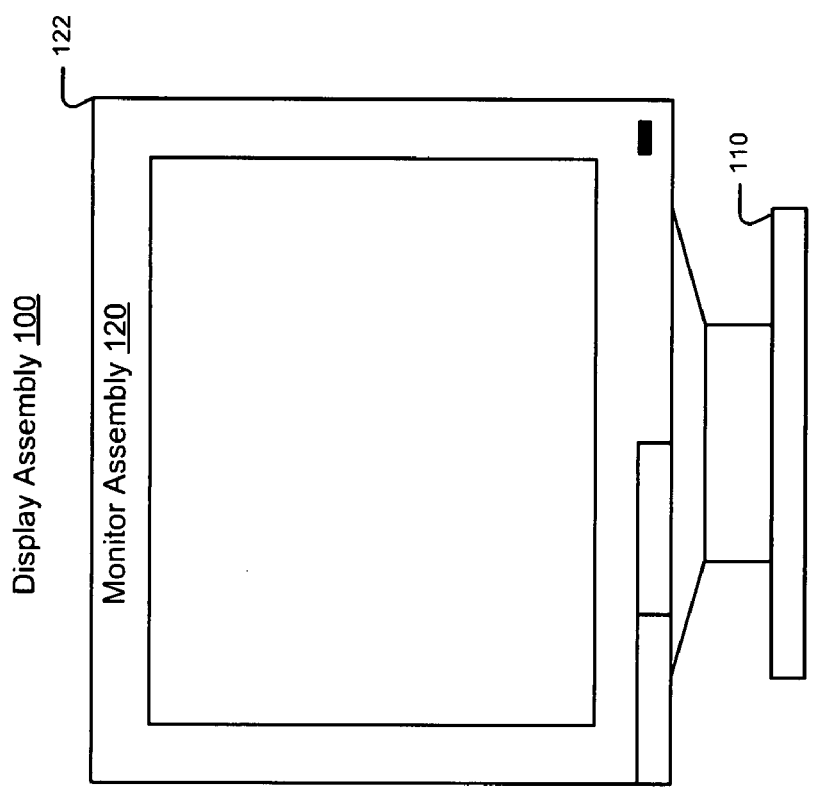
FIG. 1 is a schematic, front view of a display, according to an embodiment.

FIG. 1 is a schematic, front view of a display assembly, according to an embodiment. Referring to FIG. 1, a display assembly 100 comprises a base 110 and a monitor assembly 120 coupled to the base. Monitor assembly 120 comprises a housing 122. The display assembly 100 may be embodied as, e.g., a television, a cathode ray tube (CRT), a liquid crystal display (LCD) computer or television screen, or any other suitable display device. By way of illustration only, and not limitation, the display assembly 100 will be described with reference to a video display system. However, it will be recognized by one of ordinary skill in the art that the disclosed invention may be employed as part of a personal video recorder (PVR), television, handheld Internet appliance or any other suitable device or system employing a display device.

Figure 2:
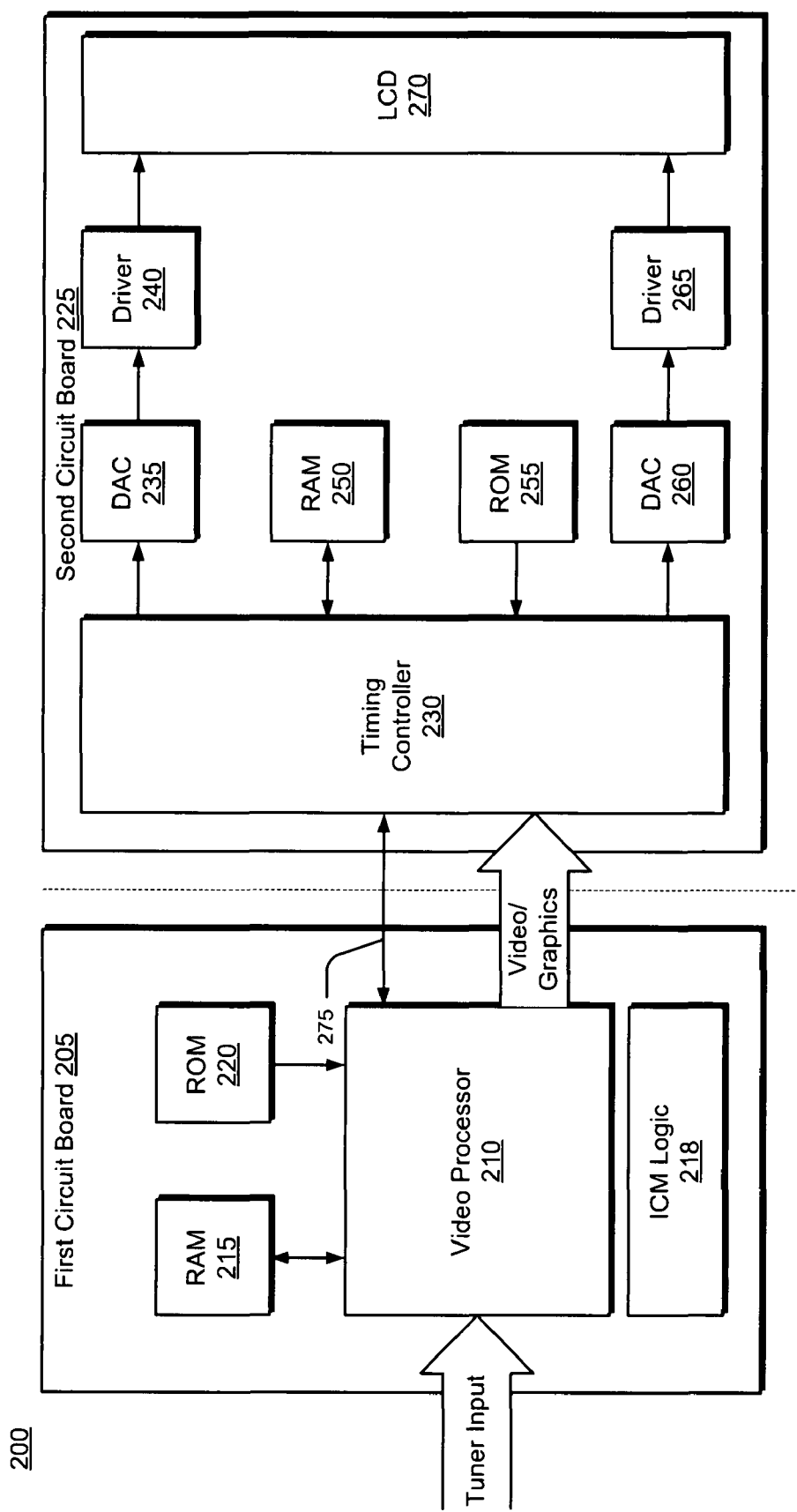
FIG. 2 is a schematic illustration of components of a display assembly, according to an embodiment.

FIG. 2 is a schematic illustration of components of a display assembly 200 according to an embodiment. Referring to FIG. 2, a video processor 210 receives input, e.g., from a tuner or a playback device such as, e.g., a video cassette recorder (VCR) or a digital video disk (DVD) player, or any other input source. In some embodiments, video processor 210 may also be implemented as a graphics controller, and may receive graphics input in addition to, or in lieu of, video input.

Computer readable memory media such as, e.g., RAM 215 and/or ROM 220 are coupled to video processor 210. In some embodiments, at least one of RAM 215 or ROM 220 comprises a color table, which stores color correction values which are applied to signals output from the video controller 210. Color correction tables and techniques for applying color correction values are disclosed in U.S. Pat. No. 7,046, 255, which is incorporated by reference above.

Display assembly 200 further includes a timing controller 230, which may correspond to the timing controller described above. Signals generated by timing controller 230 are passed through digital to analog converters (DAC) 235, 260, respectively, which apply the signals to the LCD assembly 270. In some embodiments, signals are applied to LCD in an X-Y grid system, such that DAC 235 generates signals for an X axis of LCD 270 and DAC 260 generates signals for a Y axis of LCD 270, or vise versa.

Computer readable memory media such as, e.g., RAM 250 and/or ROM 255 are coupled to timing controller 230. In some embodiments, at least one of RAM 250 or ROM 255 comprises a color table, which as described above, stores color correction values which are applied to signals output from the timing controller 230.

In some embodiments, the video processor 210 and associated memory modules 215, 220 may reside on a first circuit board 205, while the timing controller 230 and associated components may reside on a second circuit board 225. The video processor 210 and the timing controller 230 may be coupled by a communication link 275, which may be implemented as a communication bus, i.e., an I2C bus, a PCI bus, or any other suitable communication link.

In some embodiments, the display may be configured to implement integrated color management. In the embodiment depicted in FIG. 2 an integrated color management (ICM) logic module 218 is incorporated into the first circuit board 205. The ICM logic 218 may be implemented as logic instructions stored on a computer readable medium such as, e.g., RAM 215 or ROM 220, which may be executed by video processor 210 (or another processor). Hence, ICM logic 218 may be viewed logically as a component of video processor 210. Alternatively, ICM logic 218 may be implemented as firmware, or reduce to logic circuitry, e.g., on an application specific integrated circuit (ASIC) or equivalents.

Figure 3:
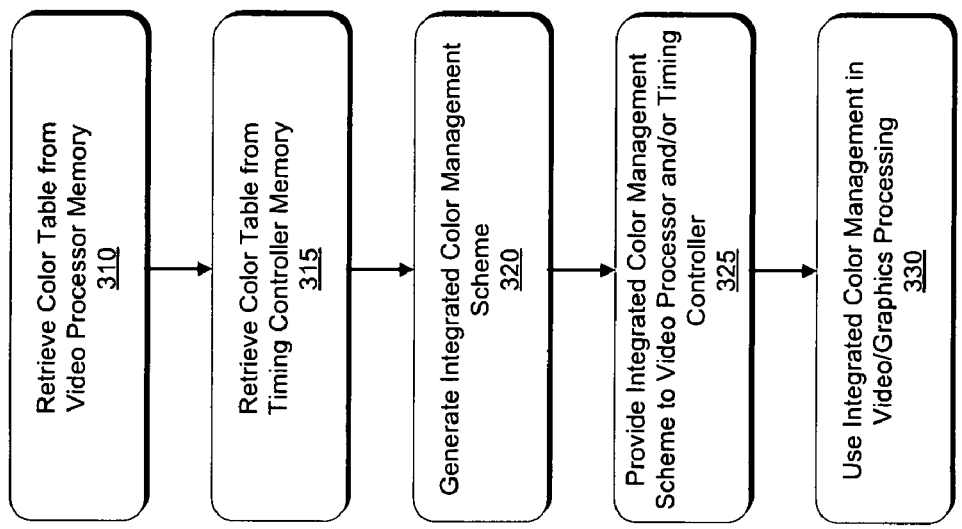
FIG. 3 is a flowchart illustrating operations in a method to implement integrated color management in a display system, according to an embodiment.

FIG. 3 is a flowchart illustrating operations in a method to implement integrated color management in a display system, according to an embodiment. In some embodiments, ICM logic 218 may implement the operations of FIG. 3 when the display 200 is initialized. In one embodiment, ICM logic 218 initiates a request to the timing controller 230 for the color table stored in the memory module(s) 250, 255, associated with the timing controller 230, and uses the data in the first color table to implement a color correction scheme in the video processor.

Referring to FIG. 3, at operation 310 ICM logic 218 retrieves the color table from the video processor memory. In the embodiment depicted in FIG. 2, ICM logic 218 retrieves the color table stored in one of RAM 215 or ROM 220. At operation 315 ICM logic 218 retrieves the color table from the timing controller memory. In the embodiment depicted in FIG. 2, ICM logic 218 may initiate a request to timing controller 230 for the color table stored in the memory module(s) 250, 255. The request may be transmitted via the communication link 275. In response to the request, the timing controller 230 may retrieve the color table from memory and transmit the color table to the video processor 210 via the communication link 275.

The video processor 210 may then use data in the color table received from the timing controller 230 to implement a color correction routine. In some embodiments, the video processor 210 generates an integrated color management scheme by merging the data in the color table from the video processor memory and the color table from the timing controller memory. Various techniques may be used to merge the two color tables. For example, ICM logic 218 may compute a linear convolution of the data in the color tables or may implement a best matching routine for the data in the first table and the second table.

The integrated color management scheme may be used to implement a color correction routine. In one embodiment at operation 325 the integrated color management scheme may be provided to the video processor 210, which at operation 230 uses the integrated color management scheme in a color correction routine.

Figure 4:
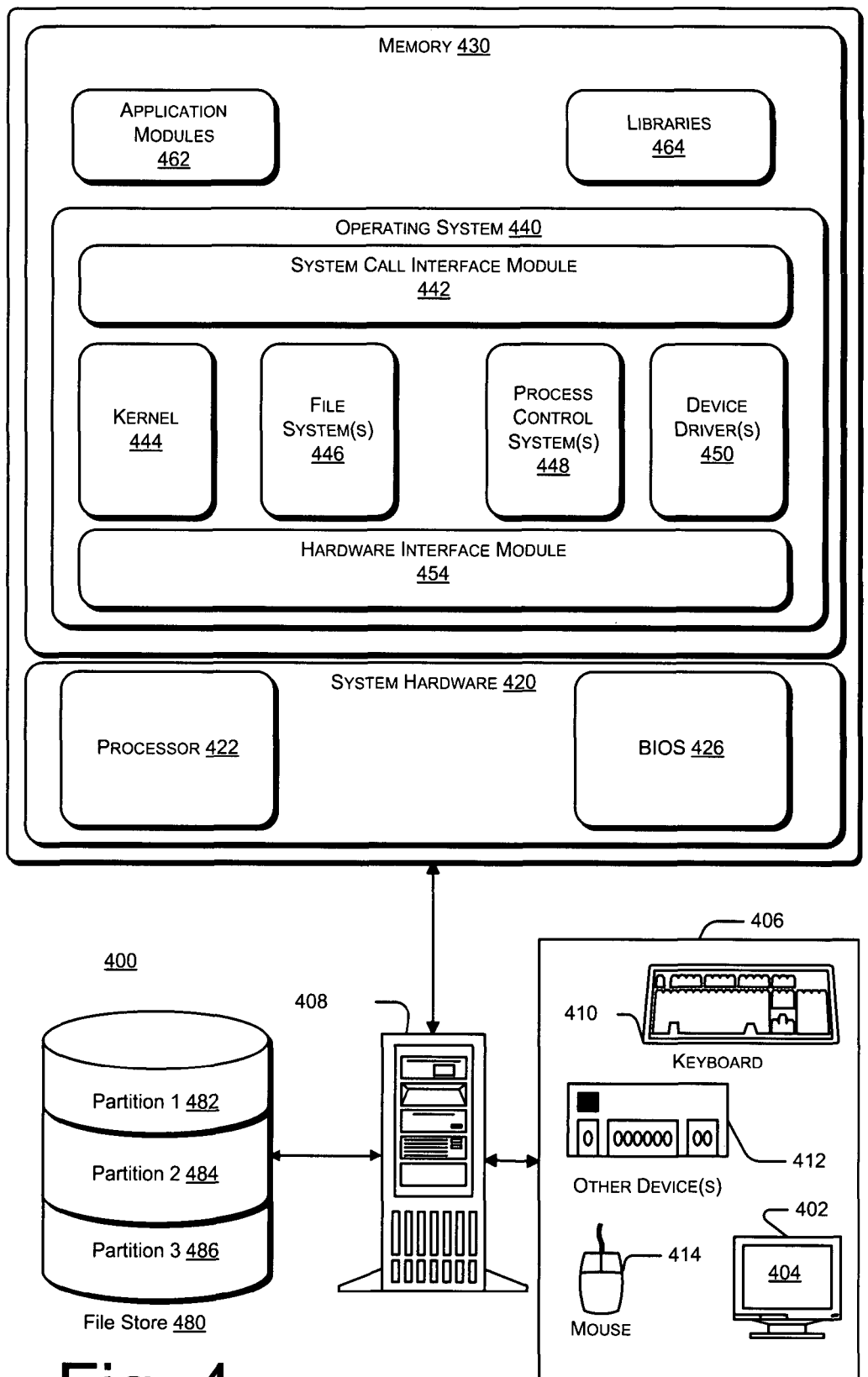
FIG. 4 is a schematic illustration of a computing system, according to an embodiment.

Thus, the structures described with reference to FIGS. 1-2 and the operations described with reference to FIG. 4 permit a display assembly to generate an integrated color management scheme by combining the color tables stored with the video processor 210 and the timing controller into a single color management table. The video processor 210 may then implement a color correction routine using the integrated color management scheme. Thus, the timing controller 230 need not include color correction logic. Alternatively, if the timing controller 230 includes color correction logic, such logic may be disabled.

In alternate embodiments the ICM logic 218 may reside on the second circuit board 225, and the timing controller 230 may request the color table stored in the memory 215, 220 associated with the video processor 210. The timing controller 230 may then generate an integrated color management scheme and may implement a color correction routine using the integrated color management scheme. Thus, the video processor 210 need not include color correction logic. Alternatively, if the video processor 210 includes color correction logic, such logic may be disabled. In other embodiments the ICM logic 218 may reside on a processing module remote from circuit boards 205, 225.

In another embodiment, a display assembly may be distributed as a component of a computer system. FIG. 4 is a schematic illustration of a computing system, according to an embodiment. The components shown in FIG. 4 are only examples, and are not intended to suggest any limitation as to the scope of the functionality of the invention; the invention is not necessarily dependent on the features shown in FIG. 4. In the illustrated embodiment, computer system 400 may be embodied as a hand-held or stationary device for accessing the Internet, a desktop PC, notebook computer, personal digital assistant, or any other processing devices that have a basic input/output system (BIOS) or equivalent.

The computing system 400 includes a computer 408 and one or more accompanying input/output devices 406 including a display 402 having a screen 404, a keyboard 410, other I/O device(s) 412, and a mouse 414. The other device(s) 412 may include, for example, a touch screen, a voice-activated input device, a track ball, and any other device that allows the system 400 to receive input from a developer and/or a user.

The computer 408 includes system hardware 420 commonly implemented on a motherboard and at least one auxiliary circuit boards. System hardware 420 includes a processor 422 and a basic input/output system (BIOS) 426. BIOS 426 may be implemented in flash memory and may comprise logic operations to boot the computer device and a power-on self-test (POST) module for performing system initialization and tests. In operation, when activation of computing system 400 begins processor 422 accesses BIOS 426 and shadows the instructions of BIOS 426 into operating memory. Processor 422 then executes power-on self-test operations to implement POST processing.

Computer system 400 further includes a file store 480 communicatively connected to computer 408. File store 480 may be internal such as, e.g., one or more hard drives, or external such as, e.g., one or more external hard drives, network attached storage, or a separate storage network. In some embodiments, the file store 480 may include one or more partitions 482, 484, 486.

Memory 430 includes an operating system 440 for managing operations of computer 408. In one embodiment, operating system 440 includes a hardware interface module 454 that provides an interface to system hardware 420. In addition, operating system 440 includes a kernel 444, one or more file systems 446 that manage files used in the operation of computer 408 and a process control subsystem 448 that manages processes executing on computer 408. Operating system 440 further includes one or more device drivers 450 and a system call interface module 442 that provides an interface between the operating system 440 and one or more application modules 462 and/or libraries 464. The various device drivers 450 interface with and generally control the hardware installed in the computing system 400.

In operation, one or more application modules 462 and/or libraries 464 executing on computer 408 make calls to the system call interface module 442 to execute one or more commands on the computer's processor. The system call interface module 442 invokes the services of the file systems 446 to manage the files required by the command(s) and the process control subsystem 448 to manage the process required by the command(s). The file system(s) 446 and the process control subsystem 448, in turn, invoke the services of the hardware interface module 454 to interface with the system hardware 420. The operating system kernel 444 can be generally considered as one or more software modules that are responsible for performing many operating system functions.

The particular embodiment of operating system 440 is not critical to the subject matter described herein. Operating system 440 may be embodied as a UNIX operating system or any derivative thereof (e.g., Linux, Solaris, etc.) or as a Windows® brand operating system or another operating system.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A display device, comprising: a timing controller;
a first computer readable memory medium coupled to the timing controller and comprising a first color table; a second computer readable memory medium coupled to a video processor and comprising a second color table;
said video processor coupled to the timing controller via a communication link and comprising logic to:
request the first color table from the timing controller; and
use data in the first color table to implement a color correction routine by combining the first color table and the second color table.

2. The display device of claim 1, wherein the timing controller resides on a first printed circuit board and the video processor resides on a second circuit board.

3. The display device of claim 2, wherein the timing controller comprises logic to:
receive the request for the first color table from the video processor;
retrieve the first color table from the first computer readable memory medium; and
transmit the first color table to the video processor via the communication link.

4. The display device of claim 1, wherein the timing controller and the video processor reside on a common circuit board.

5. The display device of claim 1, further comprising logic to disable color management operations implemented by the video processor.

6. A display device, comprising:
a timing controller, wherein the timing controller maintains a first color table;
a video processor coupled to the timing controller, wherein the video processor maintains a second color table; and
logic to:
retrieve the first color table maintained by the timing controller; retrieve the second color table maintained by the video processor;
generate an integrated color management scheme for use by the display device; and
provide the integrated color management scheme to at least one of the timing controller or the video processor.

7. The display device of claim 6, wherein the logic to generate an integrated color management scheme for use by the display device comprises logic to generate a third color table from the first color table and the second color table.

8. The display device of claim 7, wherein the third color table represents a linear convolution of the first table and the second table.

9. The display device of claim 7, wherein the third color table represents a best matching combination of the first table and the second table.

10. The display device of claim 6, wherein the logic to provide the integrated color management scheme to at least one of the timing controller or the video processor comprises logic to upload the integrated color management scheme into a memory module associated with at least one of the timing controller or the video processor.

11. The display device of claim 6, wherein the logic to provide the integrated color management scheme to at least one of the timing controller or the video processor comprises logic to disable color management operations implemented by the timing controller.

12. The display device of claim 6, wherein the logic to provide the integrated color management scheme to at least one of the timing controller or the video processor comprises logic to disable color management operations implemented by the video processor.

13. A computer system, comprising:
a computing device; and a display device, comprising: a timing controller;
a first computer readable memory medium coupled to the timing controller and comprising a first color table; a second computer readable memory medium coupled to a video processor and comprising a second color table; and
said video processor coupled to the timing controller via a communication link and comprising logic to:
request the first color table from the timing controller; and
use data in the first color table to implement a color correction routine by combining the first color table and the second color table.

14. The computer system of claim 13, wherein the timing controller resides on a first printed circuit board and the video processor resides on a second circuit board.

15. The computer system of claim 14, wherein the timing controller comprises logic to:
receive the request for the first color table from the video processor;
retrieve the first color table from the first computer readable memory medium; and
transmit the first color table to the video processor via the communication link.

16. The computer system of claim 13, wherein the timing controller and the video processor reside on a common circuit board.

* * * * *